(No Model.)
D. A. BRISLIN.
PIPE THIMBLE.
No. 564,967. Patented Aug. 4, 1896.
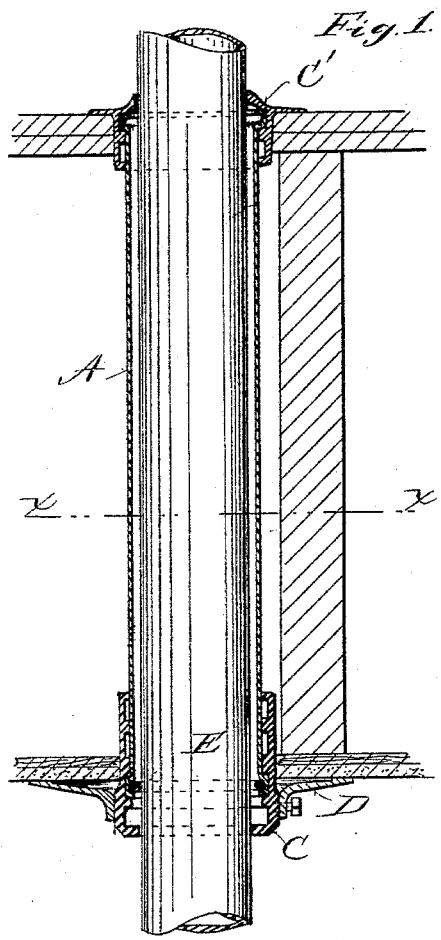
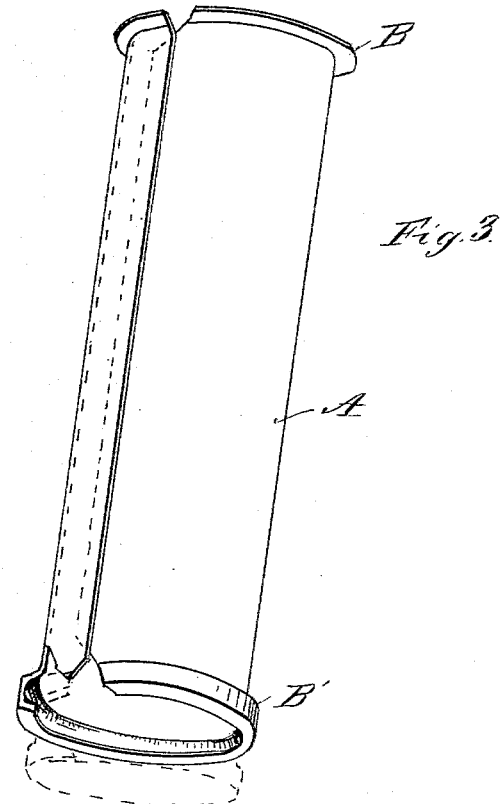
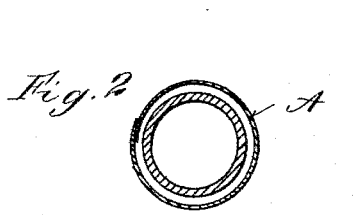
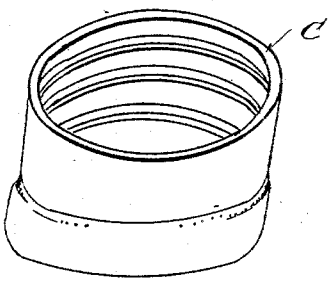
Witnesses.
S. T. Little
F. Forrester
Inventor.
D. A. Brislin
By H. M. Paisted
Attorney

UNITED STATES PATENT OFFICE.

DAVID A. BRISLIN, OF ST. LOUIS, MISSOURI.

PIPE-THIMBLE.

SPECIFICATION forming part of Letters Patent No. 564,967, dated August 4, 1896.

Application filed June 8, 1895. Serial No. 552,090. (No model.)

*To all whom it may concern:*

Be it known that I, DAVID A. BRISLIN, a citizen of the United States, residing at St. Louis, in the State of Missouri, have invented certain new and useful Improvements in Pipe-Thimbles, of which the following is a specification, reference being had therein to the accompanying drawings.

This invention relates to certain new and useful improvements in slip-tubes used in floors and partitions to protect the same from steam-pipes, &c.

The object of my invention is to provide a collapsing and expanding tube for engagement with a socket or end pieces at one or both ends, whereby it will be held together by the spring of the tube, and by which it may be adjusted to suit different thicknesses of partition or other places where it may be used. The peculiarities of my invention will hereinafter be fully described and claimed.

In the accompanying drawings, on which like reference-letters indicate corresponding parts, Figure 1 represents a section through a floor and my improved tube applied to a steam-pipe passing therethrough; Fig. 2, a cross-section on the line $x\ x$, Fig. 1; Fig. 3, a perspective detail view of my collapsible spring-tube; Fig. 4, a similar view of a socket therefor, and Fig. 5 showing an inside bead.

It is required in many cities that steam-pipes passing through partitions shall be protected by suitable guard-coverings of asbestos or metal. To meet this requirement by a simple effective construction, I provide a tube A the side edges of which overlap and are not permanently soldered or otherwise fastened together. The tube may thus be sprung inward by pressure of the hand to a smaller diameter, and the spring of the material of the tube will expand it again. In order to increase this spring effect, I provide a flange or bead B B', preferably projecting outward, which will engage with projections, such as one or more ridges and grooves in a socket C, and thus connect the members together. In a floor this socket C passes through the lathing of the ceiling, and after the plastering is done a flange-collar D is mounted on the projecting end by set-screw or otherwise, as shown in Fig. 1. These socket-grooves give sufficient nicety of adjustment in most cases, but for better appearance I mount the flange-collar D adjustably, by means of a set-screw or otherwise, on one end piece, close against the ceiling, as shown. Thus a half-inch projection more or less than the exact length desired does not affect the appearance or usefulness of my device.

The other end of the tube is sprung into another socket or floor-flange C', which rests on the floor above the ceiling referred to and supports the lower flange-socket and connecting-tube, as shown in Fig. 1. An air-space is thus formed around the pipe.

Any suitable form of flange, bead, or other projection may be used on the ends of the tubes, by which it may engage with a suitable socket on either end. By the grooves in said socket, as above described, the tube may be slipped straight in or out till it fits the floor or partition, and then the spring of the metal will lock it in position. This adjustable feature is an important part of my invention. I do not limit myself to any special form of bead or flange, which may be rounded or square, or other form, as may be desired; also the end pieces C C' may be of socket or other suitable form.

While the resiliency of the material composing the tube is increased by the bead or flange to a sufficient extent in small sizes, yet a large diameter of tube may require other means to give the return-spring. I may therefore use a split hoop or wire E, mounted in the bead or otherwise, which will assist the outward spring of the end of the tube into the socket-groove of the adjacent collar. Fig. 1 shows this spring-hoop in position. Ordinarily, however, the bead or flange gives the necessary stiffness, besides forming the retaining-shoulder.

The simplicity and adaptability of my invention are apparent when it is seen that a man may take a number of suitable collars and with an ordinary beading-tool may turn up the end shoulder on tube after tube, which he can cut and roll by hand at each point where such protection is required. No exact measurement is necessary, as the tube may be cut of approximate length and adjusted to an exact fit by the shoulder and socket or equivalent means, above described. Furthermore, the adaptability for manufacture in large quantities is evident, as the adjustment of length admits of considerable difference in thickness of partitions.

The shoulder B B' is preferably formed on the outside of the tube, but will not depart from my invention if it be formed on the inside and the tube be expanded to snap over the ridge, as shown in Fig. 5.

This device is also known to the trade as a "fireproof floor-sleeve."

Having thus fully described my invention, what I claim as new, and desire to secure by Letters Patent, is—

1. The combination with a pipe passing through a partition, of a resilient tube inclosing said pipe and of fixed length, and end pieces or sockets mounted on said tube to support its ends away from the pipe and form an air-space, one or both of said end pieces being adjustable lengthwise of the tube by the resiliency of the latter.

2. The combination with a partition and a pipe passing therethrough, of a resilient slip-tube of fixed length that is substantially the thickness of the partition, and inclosing said pipe, a socket at one side of the partition, and a matching socket or end piece, at the other side of the partition, one of said end pieces being adjustable on the tube by means of interlocking grooves and projections on the tube and end piece, substantially as described.

3. As an improved article of manufacture, a slip-tube guard for a hot pipe through a partition, consisting of an inclosing tube for the pipe and of a fixed length and forming a dead-air space about the pipe, a socket at each end of the said tube, one or both provided with independent grooves and projections adapted to engage with the corresponding shoulder on the end of the tube, for the adjustment of the end pieces to the partition, and an adjustable collar mounted on the adjustable end piece, substantially as described.

4. As an improved article of manufacture, a flanged socket having a plurality of circumferential alternating grooves and ridges, of a resilient slip-tube having a circumferential bead and shoulder at one end adapting it to be adjusted lengthwise with regard to said socket, and a flanged end piece on the other end of said tube, whereby a single tube adjustably connects the two flanged end pieces.

5. A slip-tube having overlapping unconnected side edges and an outwardly-projecting circumferential bead or groove at the end, and provided with a spring hoop or ring mounted in said groove, substantially as described.

6. The combination with a slip-tube having unconnected side edges, and a spring ring or hoop tending to return the tube to its original diameter after varying its diameter.

In testimony whereof I affix my signature in presence of two witnesses.

DAVID A. BRISLIN.

Witnesses:
H. M. PLAISTED,
D. P. LITTLE.